US010819923B1

(12) United States Patent
McCauley et al.

(10) Patent No.: US 10,819,923 B1
(45) Date of Patent: Oct. 27, 2020

(54) THERMAL IMAGING FOR SELF-DRIVING CARS

(71) Applicant: Waymo LLC, Mountain View, CA (US)

(72) Inventors: Alexander McCauley, Sunnyvale, CA (US); Ralph H. Shepard, Menlo Park, CA (US); Brandyn White, Mountain View, CA (US); Simon Verghese, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/688,081

(22) Filed: Nov. 19, 2019

(51) Int. Cl.
| | | |
|---|---|---|
| *G06K 9/00* | (2006.01) | |
| *H04N 5/33* | (2006.01) | |
| *G06N 3/08* | (2006.01) | |
| *G01J 5/04* | (2006.01) | |
| *G01S 17/87* | (2020.01) | |
| *G01J 5/02* | (2006.01) | |
| G01J 5/00 | (2006.01) | |

(52) U.S. Cl.
CPC .............. *H04N 5/332* (2013.01); *G01J 5/025* (2013.01); *G01J 5/041* (2013.01); *G01S 17/87* (2013.01); *G06K 9/00791* (2013.01); *G06N 3/08* (2013.01); *G01J 2005/0077* (2013.01)

(58) Field of Classification Search
CPC ................................ H04N 5/332; G06K 9/00
See application file for complete search history.

(56) References Cited

U.S. PATENT DOCUMENTS

| | | | |
|---|---|---|---|
| 8,818,079 B2 | 8/2014 | Phan et al. | |
| 10,094,916 B1 * | 10/2018 | Droz | G01S 17/89 |
| 10,116,885 B2 | 10/2018 | Beall et al. | |
| 10,268,919 B1 * | 4/2019 | Piekniewski | G06K 9/00664 |
| 10,302,749 B2 * | 5/2019 | Droz | G01S 7/4972 |
| 10,578,724 B2 * | 3/2020 | Droz | G01S 17/42 |
| 10,657,409 B2 * | 5/2020 | Piekniewski | G06K 9/00624 |
| 10,657,552 B2 * | 5/2020 | Sarin | G06Q 30/0224 |
| 2015/0379659 A1 * | 12/2015 | Robert | H04N 19/51 |
| | | | 382/100 |

(Continued)

FOREIGN PATENT DOCUMENTS

WO    2008/010832    1/2008

*Primary Examiner* — Paulos M Natnael
(74) *Attorney, Agent, or Firm* — McDonnell Boehnen Hulbert & Berghoff LLP

(57) ABSTRACT

The present disclosure relates to systems and methods that utilize machine learning techniques to improve object classification in thermal imaging systems. In an example embodiment, a method is provided. The method includes receiving, at a computing device, one or more infrared images of an environment. The method additionally includes, applying, using the computing device, a trained machine learning system on the one or more infrared images to determine an identified object type in the environment by at least: determining one or more prior thermal maps associated with the environment; using the one or more prior thermal maps and the one or more infrared images, determining a current thermal map associated with the environment; and determining the identified object type based on the current thermal map. The method also includes providing the identified object type using the computing device.

18 Claims, 11 Drawing Sheets

(56) References Cited

U.S. PATENT DOCUMENTS

| | | | |
|---|---|---|---|
| 2016/0284075 A1 | 9/2016 | Phan et al. | |
| 2016/0358190 A1* | 12/2016 | Terrazas | G06F 16/29 |
| 2017/0186291 A1* | 6/2017 | Wenus | G01S 3/786 |
| 2017/0236142 A1* | 8/2017 | Sarin | G06Q 30/0283 |
| | | | 705/14.25 |
| 2017/0275023 A1* | 9/2017 | Harris | B64C 39/024 |
| 2018/0004231 A1* | 1/2018 | Michini | G05D 1/101 |
| 2018/0372853 A1* | 12/2018 | Droz | G01S 7/4972 |
| 2019/0226913 A1 | 7/2019 | Wang et al. | |
| 2019/0235064 A1* | 8/2019 | Droz | G01S 7/4972 |
| 2019/0251386 A1* | 8/2019 | Piekniewski | G06T 3/00 |
| 2019/0259108 A1* | 8/2019 | Bongartz | G06Q 50/02 |
| 2019/0339687 A1* | 11/2019 | Cella | G06K 9/6263 |
| 2019/0380662 A1* | 12/2019 | Kwan | G16H 20/10 |
| 2020/0041620 A1* | 2/2020 | Onal | G01S 17/86 |
| 2020/0104567 A1* | 4/2020 | Tajbakhsh | G06K 9/00275 |
| 2020/0142069 A1* | 5/2020 | Onal | G01S 7/497 |

\* cited by examiner

US 10,819,923 B1

THERMAL IMAGING FOR SELF-DRIVING CARS

BACKGROUND

Thermal (or infrared) imaging devices may be used to classify objects in a given environment. For example, a thermal imaging device may obtain radiometric information about a given object, which may be utilized to determine the given object's temperature if the emissivity value for the given object can be estimated. When multiple objects with estimated emissivity values are involved, the thermal imaging device can determine variations in temperatures between objects and, in turn, can make predictions about a composition or a type of the objects.

SUMMARY

The present disclosure beneficially utilizes machine learning techniques to improve object classification in thermal imaging systems.

In a first aspect, a method is provided. The method includes receiving, at a computing device, one or more infrared images of an environment. The method additionally includes applying, using the computing device, a trained machine learning system on the one or more infrared images to determine an identified object type in the environment. Applying the trained machine learning system includes determining one or more prior thermal maps associated with the environment. Applying the trained machine learning system also includes, using the one or more prior thermal maps and the one or more infrared images, determining a current thermal map associated with the environment and determining the identified object type based on the current thermal map. The method also includes providing the identified object type using the computing device.

In a second aspect, a method is provided. The method includes receiving, at a computing device, one or more infrared images of an environment. The method additionally includes training, using the computing device, a machine learning system on the one or more infrared images to determine an identified object type in the environment. Training the machine learning system includes training the machine learning system to determine one or more prior thermal maps associated with the environment. Training the machine learning system also includes, using the one or more prior thermal maps and the one or more infrared images, training the machine learning system to determine a current thermal map associated with the environment and training the machine learning system to determine the identified object type using the current thermal map. The method also includes providing the trained machine learning system using the computing device.

In a third aspect, a computing device is provided. The computing device includes one or more processors and data storage. The data storage has stored thereon computer-executable instructions that, when executed by the one or more processors, cause the computing device to carry out operations. The operations include receiving one or more infrared images taken of an environment. The operations also include applying a trained machine learning system to the one or more infrared images to determine an identified object type in the environment. Applying the trained machine learning system includes determining one or more prior thermal maps associated with the environment. Applying the trained machine learning system also includes, using the one or more prior thermal maps and the one or more infrared images, determining a current thermal map associated with the environment and determining the identified object type based on the current thermal map. The operations further include providing the identified object type.

Other aspects, embodiments, and implementations will become apparent to those of ordinary skill in the art by reading the following detailed description, with reference where appropriate to the accompanying drawings.

DETAILED DESCRIPTION

Figure 1:
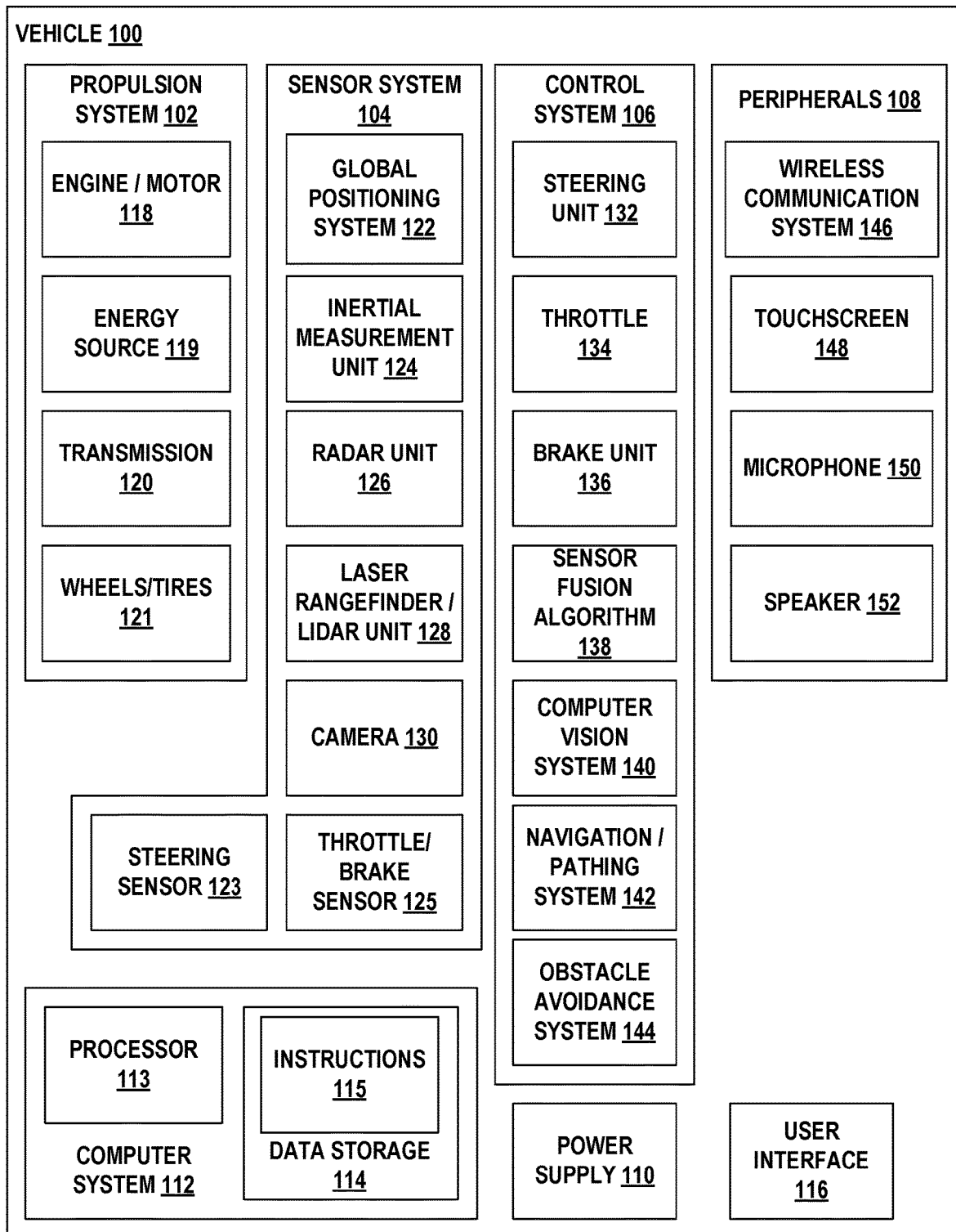
FIG. 1 illustrates a block diagram of a vehicle, in accordance with example embodiments.
Figure 2A:
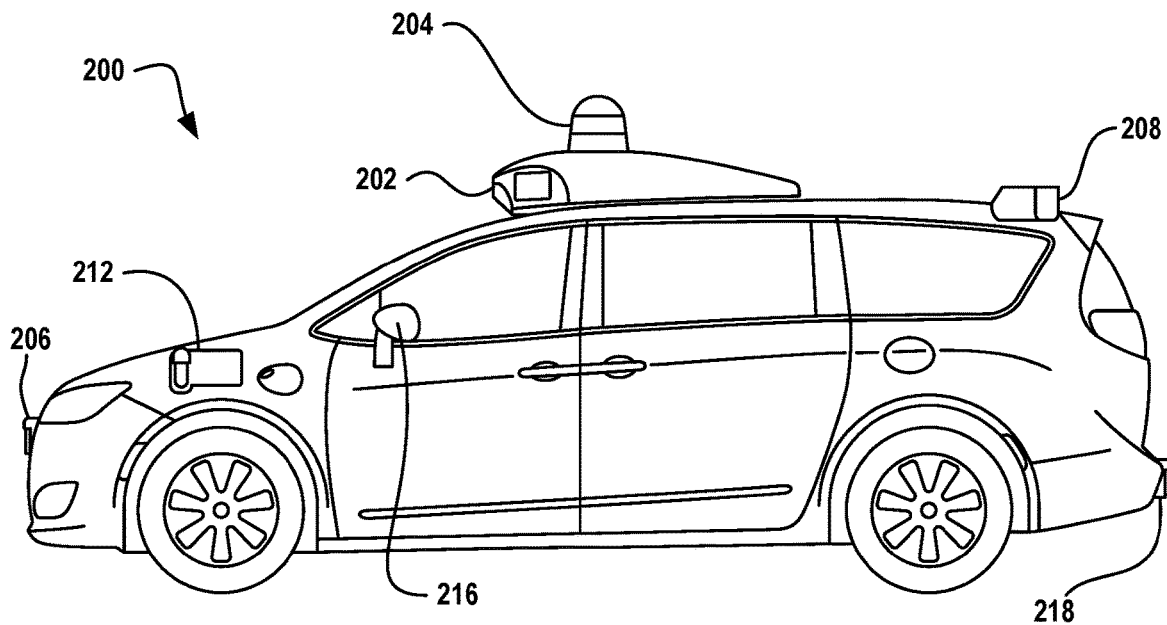
FIGS. 2A, 2B, 2C, 2D, and 2E illustrate a physical configuration of a vehicle, in accordance with example embodiments.
Figure 2B:
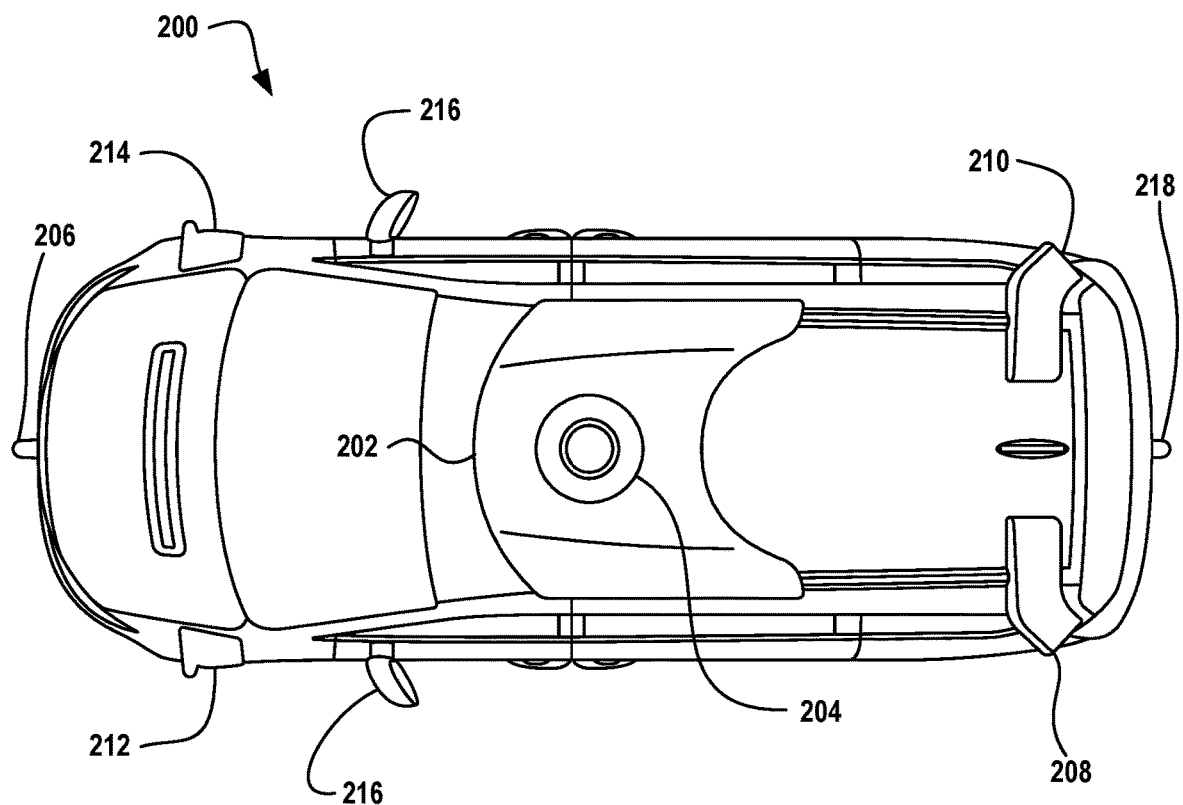
Figure 2C:
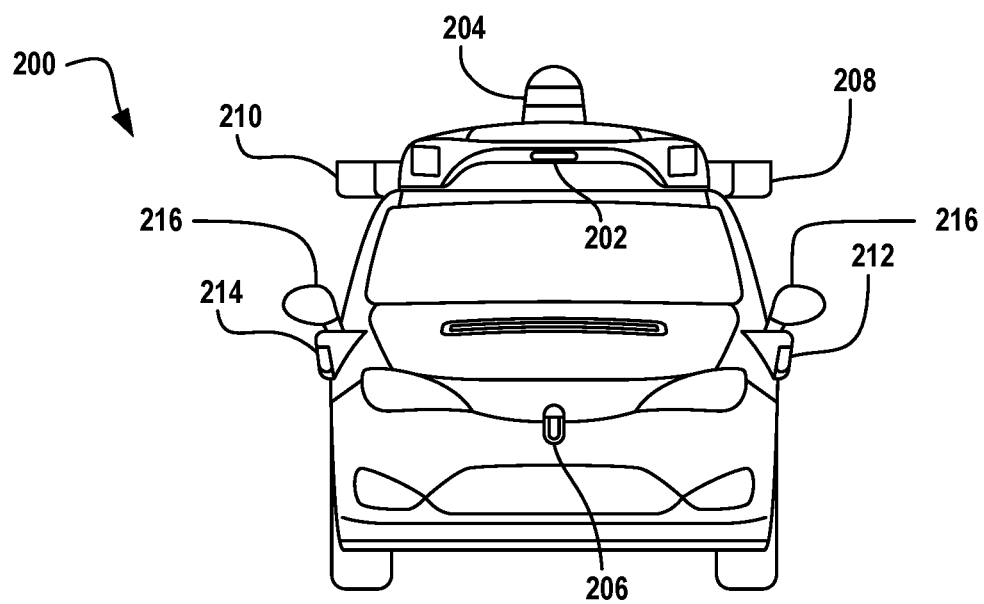
Figure 2D:
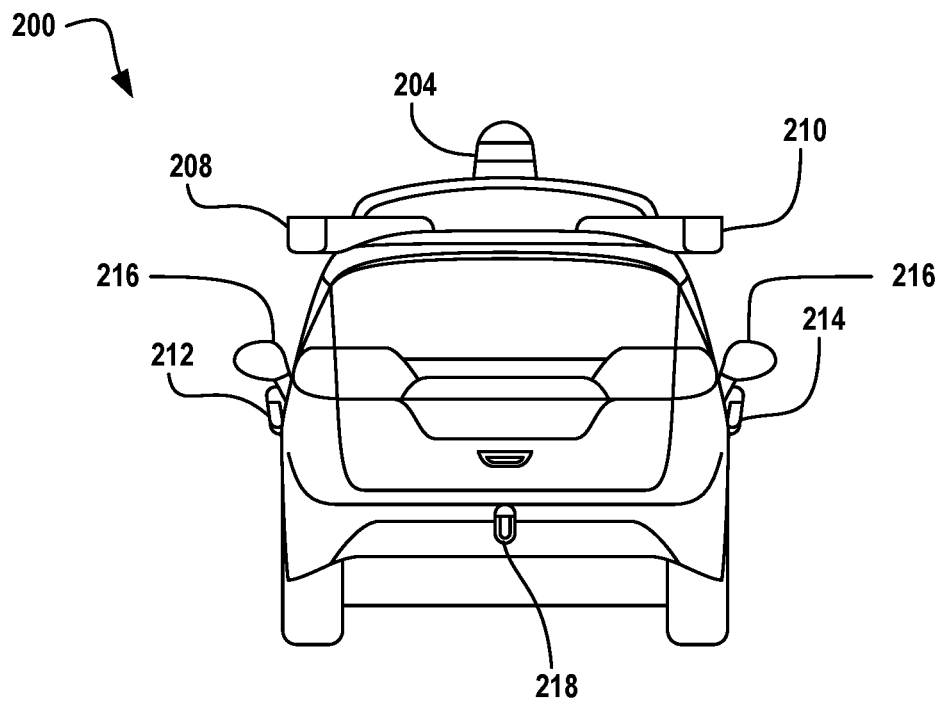
Figure 2E:
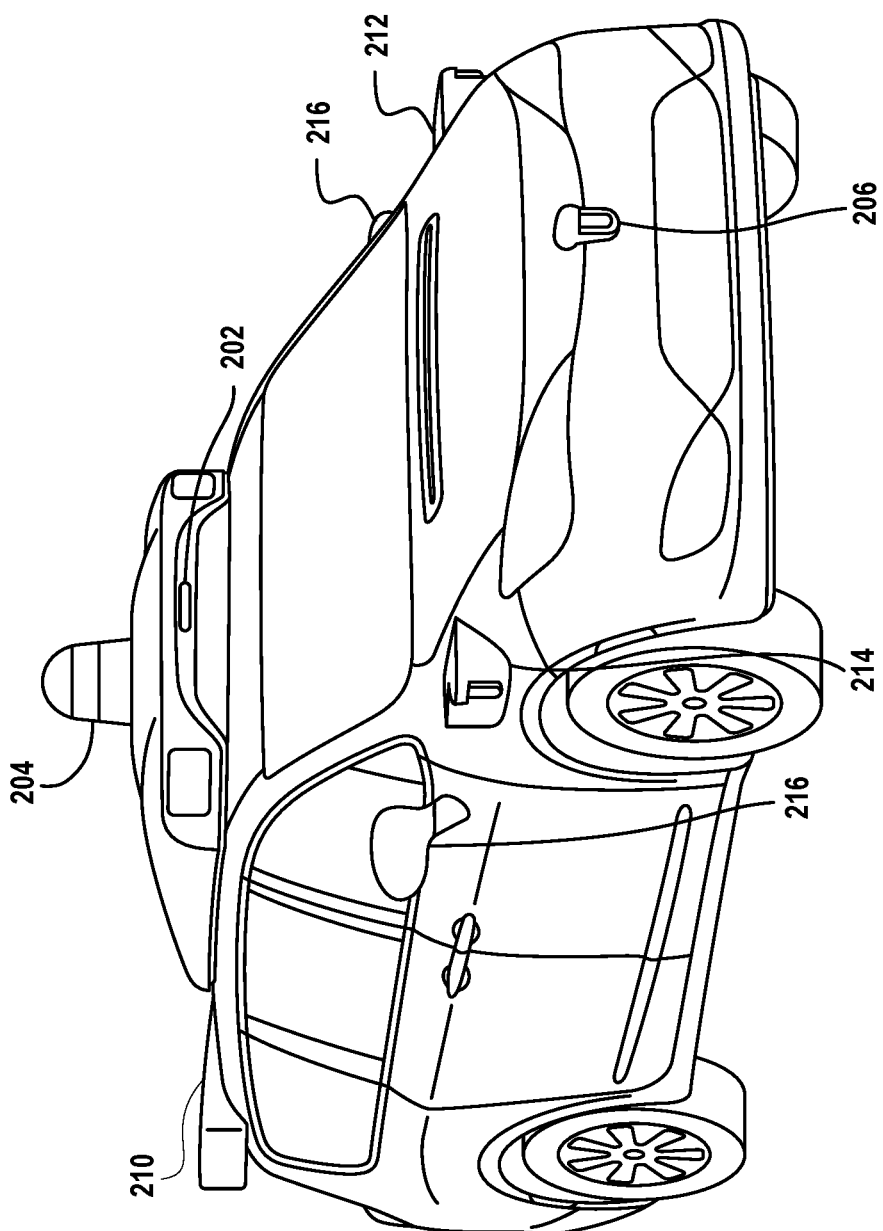

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Conventional sensor systems are prone to misidentify and/or misclassify objects in a given environment. Such underperformance can be especially true for identification techniques that utilize thermal imaging. In such scenarios, large temperature variations in the environment can make it difficult for thermal imaging systems to detect objects. For example, daily and/or seasonal variations in the environment may change the appearance of objects of interest, introduce thermal noise, and so on. Such variations limit the ability to reliably train machine learning models to classify objects based on thermal images (or referred to herein as "thermal maps") obtained from the thermal imaging systems. While some solutions attempt to normalize the variations with radiometrically-calibrated cameras that estimate temperatures in the environment, the accuracy of these estimates is limited by one or more assumptions about or approximations of object emissivity in the given environment.

The embodiments described herein may improve the performance of thermal imaging systems to correctly identify and/or classify objects in a given environment. In particular, the disclosure herein provides for a machine learning system that can accurately predict the emissivity and/or temperature of objects in the environment. Accordingly, the classification of objects within such environments can be improved.

In some embodiments, the machine learning system may include a model trained on visible and near-infrared reflectivity, 2-color infrared emissions, LIDAR data, and/or ambient temperature/sun-location/weather data to infer emissivity of objects in the environment so as to more accurately estimate the physical temperature of such objects.

To further improve classifications, the machine learning system may compare current thermal images to prior thermal images processed to remove the living objects. Moreover, the systems and methods herein may also combine LIDAR data with thermal images to detect and track moving living-objects by associating points of objects between different thermal image frames. Other embodiments, aspects, and improvements are also possible.

II. Example Systems

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, according to example embodiments, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). Further, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, BLUETOOTH®, or ZIG-BEE®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by other systems. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 that can include some or all of the functions described in connection with vehicle 100 in reference to FIG. 1, according to example embodiments. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first LIDAR unit 204, a second LIDAR unit 206, a first radar unit 208, a second radar unit 210, a first LIDAR/radar unit 212, a second LIDAR/radar unit 214, and two additional locations 216, 218 at which a radar unit, LIDAR unit, laser rangefinder unit, and/or other type of sensor or sensor(s) could be located on the vehicle 200. Each of the first LIDAR/radar unit 212 and the second LIDAR/radar unit 214 can take the form of a LIDAR unit, a radar unit, or both.

Furthermore, the example vehicle 200 can include any of the components described in connection with vehicle 100 of FIG. 1. The first and second radar units 208, 210 and/or the first and second LIDAR units 204, 206 can actively scan the surrounding environment for the presence of potential obstacles and can be similar to the radar 126 and/or laser rangefinder/LIDAR 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of vehicle 200, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first LIDAR/radar unit 212 and the second LIDAR/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the electromagnetic spectrum, such as infrared or ultraviolet light. The camera can be a two-dimensional detector, and can optionally have a three-dimensional spatial range of sensitivity.

In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object.

The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
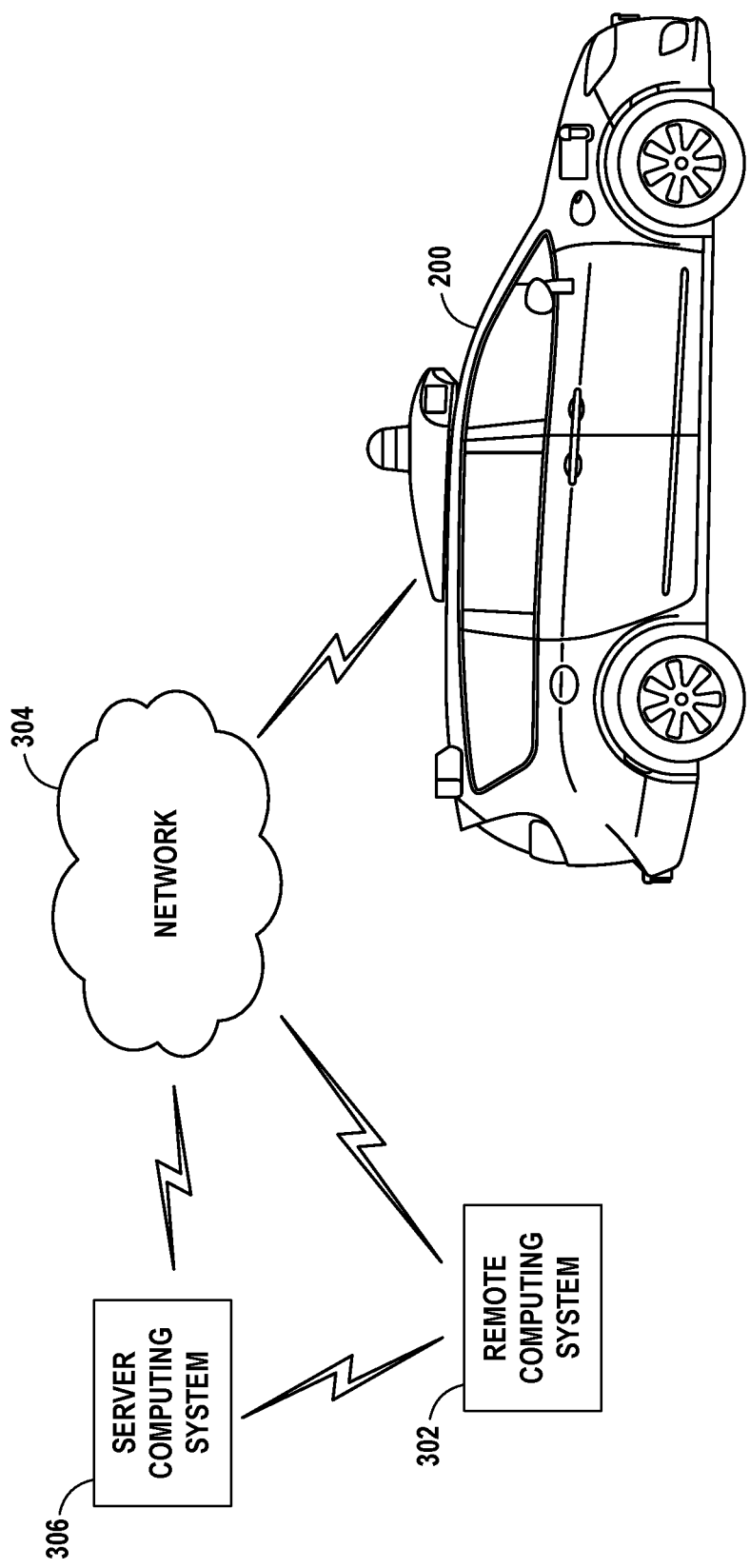
FIG. 3 illustrates wireless communication between various computing systems related to a vehicle, in accordance with example embodiments.

FIG. 3 is a conceptual illustration of wireless communication between various computing systems related to a vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 100 or vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation, a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object, but is not highly confident in such a detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a LIDAR unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

III. Example Machine Learning Systems

Figure 4:
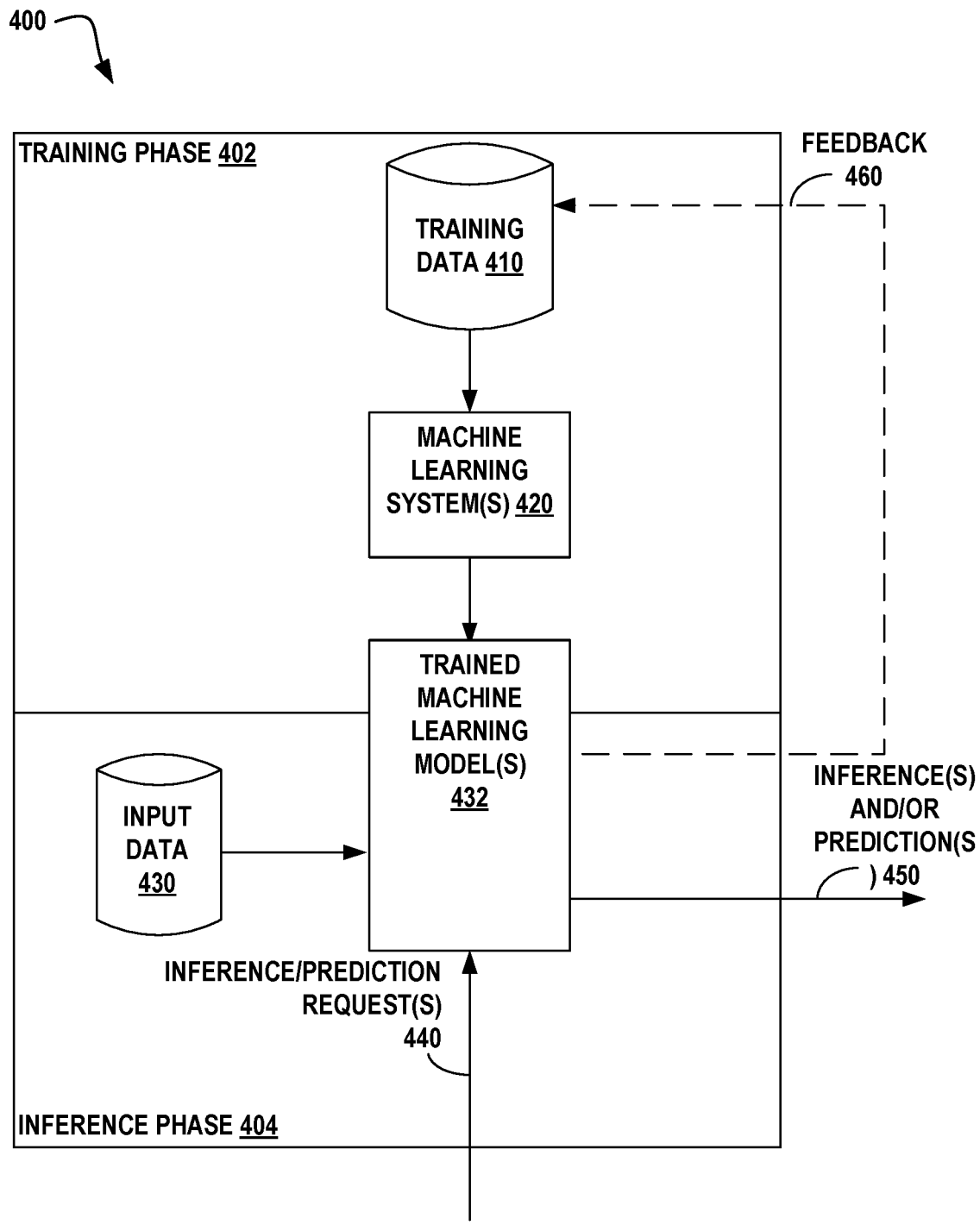
FIG. 4 illustrates a training phase and an inference phase of machine learning models, in accordance with example embodiments.

FIG. 4 shows system 400 illustrating a training phase 402 and an inference phase 404 of trained machine learning model(s) 432, in accordance with example embodiments. Some machine learning techniques involve training one or more machine learning systems on an input set of training data to recognize patterns in the training data and provide output inferences and/or predictions about (patterns in the) training data. The resulting trained machine learning model can be called a trained machine learning system or a trained machine learning model. For example, FIG. 4 shows training phase 402 where one or more machine learning systems 420 are being trained on training data 410 to become one or more trained machine learning model(s) 432. Then, during inference phase 404, trained machine learning model(s) 432 can receive input data 430 and one or more inference/prediction requests 440 (perhaps as part of input data 430) and responsively provide as an output one or more inferences and/or predictions 450.

Machine learning system(s) 420 may include, but are not limited to: an artificial neural network (e.g., a herein-described convolutional neural network using herein-described segmentation techniques, a recurrent neural network), a Bayesian network, a hidden Markov model, a Markov decision process, a logistic regression function, a support vector machine, a suitable statistical machine learning algorithm, and/or a heuristic machine learning system. During training phase 402, machine learning system(s) 420 can be trained by providing at least training data 410 as training input using training techniques, such as but not limited to, unsupervised, supervised, semi-supervised, reinforcement learning, transfer learning, incremental learning, and/or curriculum learning techniques.

Unsupervised learning involves providing a portion (or all) of training data 410 to machine learning system(s) 420. Then, machine learning system(s) 420 can determine one or more output inferences based on the provided portion (or all) of training data 410. Supervised learning can involve providing a portion of training data 410 to machine learning system(s) 420, with machine learning system(s) 420 determining one or more output inferences based on the provided portion of training data 410, and the output inference(s) are either accepted or corrected based on correct results associated with training data 410. In some examples, supervised learning of machine learning system(s) 420 can be governed by a set of rules and/or a set of labels for the training input, and the set of rules and/or set of labels may be used to correct inferences of machine learning system(s) 420.

Semi-supervised learning can involve having correct results (e.g., partially-labeled data) for part, but not necessarily all, of training data 410. During semi-supervised learning, supervised learning is used for a portion of training data 410 having correct results, and unsupervised learning is used for a portion of training data 410 not having correct results.

Reinforcement learning involves machine learning system(s) 420 receiving a reward signal regarding a prior inference, where the reward signal can be a numerical value. During reinforcement learning, machine learning system(s) 420 can output an inference and receive a reward signal in response, where machine learning system(s) 420 are configured to try to maximize the numerical value of the reward signal. In some examples, reinforcement learning also utilizes a value function that provides a numerical value representing an expected total of the numerical values provided by the reward signal over time.

Transfer learning techniques can involve trained machine learning model(s) 432 being pre-trained on one set of data and additionally trained using training data 410. More particularly, machine learning system(s) 420 can be pre-trained on data from one or more computing devices and a resulting trained machine learning model provided to computing device CD1, where CD1 is intended to execute the trained machine learning model during inference phase 404. Then, during training phase 402, the pre-trained machine learning model can be additionally trained using training data 410, where training data 410 can be derived from kernel and non-kernel data of computing device CD1. This further training of the machine learning system(s) 420 and/or the pre-trained trained machine learning model using training data 410 of CD1's data can be performed using either supervised or unsupervised learning. Once machine learning system(s) 420 and/or the pre-trained machine learning model has been trained on at least training data 410, training phase 402 can be completed. The trained resulting machine learning model can be utilized as at least one of trained machine learning model(s) 432.

Incremental learning techniques can involve providing trained machine learning model(s) 432 (and perhaps machine learning system(s) 420) with input data that is used to continuously extend knowledge of trained machine learning model(s) 432. Curriculum learning techniques can involve providing machine learning system(s) 420 with training data arranged in a particular order, such as providing relatively-easy training examples first and proceeding with progressively more difficult training examples e.g., analogously to a curriculum or course of study at a school. Other techniques for training machine learning system(s) 420 and/or trained machine learning model(s) 432 are possible as well.

In some examples, after training phase 402 has been completed but before inference phase 404 begins, trained machine learning model(s) 432 can be provided to a computing device CD1 where trained machine learning model(s) 432 are not already resident; e.g., after training phase 402 has been completed, trained machine learning model(s) 432 can be downloaded to computing device CD1.

For example, a computing device CD2 storing trained machine learning model(s) 432 can provide trained machine learning model(s) 432 to computing device CD1 by one or more of: communicating a copy of trained machine learning model(s) 432 to computing device CD1, making a copy of trained machine learning model(s) 432 for computing device CD1, providing access to trained machine learning model(s) 432 computing device CD1, and/or otherwise providing the trained machine learning system to computing device CD1. In some examples, trained machine learning model(s) 432 can be used by computing device CD1 immediately after being provided by computing device CD2. In some examples, after trained machine learning model(s) 432 are provided to computing device CD1, trained machine learning model(s) 432 can be installed and/or otherwise prepared for use before trained machine learning model(s) 432 can be used by computing device CD1.

During inference phase 404, trained machine learning model(s) 432 can receive input data 430 and generate and output corresponding inference(s) and/or prediction(s) 450 about input data 430. As such, input data 430 can be used as an input to trained machine learning model(s) 432 for providing corresponding inference(s) and/or prediction(s) 450 to kernel components and non-kernel components. For example, trained machine learning model(s) 432 can generate inference(s) and/or prediction(s) 450 in response to inference/prediction request(s) 440. In some examples, trained machine learning model(s) 432 can be executed by a portion of other software. For example, trained machine learning model(s) 432 can be executed by an inference or prediction daemon to be readily available to provide inferences and/or predictions upon request. Input data 430 can include data from computing device CD1 executing trained machine learning model(s) 432 and/or input data from one or more computing devices other than CD1.

In some examples, input data 430 can include data from the environment in which vehicle 100/200 operates. As described above, vehicle 100/200 may have various sensors, including a camera, a radar unit, a laser range finder, a microphone, a radio unit, and other sensors. Each of these sensors may communicate this environment data as input into trained machine learning model(s) 432. Notably, other types of input data are possible as well.

Inference(s) and/or prediction(s) 450 can include output images, thermal maps, depth maps, numerical values, and/or other output data produced by trained machine learning model(s) 432 operating on input data 430 (and training data 410). In some examples, trained machine learning model(s) 432 can use output inference(s) and/or prediction(s) 450 as input feedback 460. Trained machine learning model(s) 432 can also utilize past inferences as inputs for generating new inferences.

In some examples, machine learning system(s) 420 and/or trained machine learning model(s) 432 can be executed and/or accelerated using one or more computer processors and/or on-device coprocessors. The on-device coprocessor(s) can include, but are not limited to one or more graphic processing units (GPUs), one or more tensor processing units (TPUs), one or more digital signal processors (DSPs), and/or one or more application specific integrated circuits (ASICs). Such on-device coprocessors can speed up training of machine learning system(s) 420 and/or generation of inference(s and/or prediction(s) 450 by trained machine learning model(s) 432. In some examples, trained machine learning model(s) 432 can be trained, reside and execute to provide inference(s) and/or prediction(s) 450 on a particular computing device, and/or otherwise can make inferences for the particular computing device.

In some examples, one computing device CD_SOLO can include trained machine learning model(s) 432, perhaps after performing the training of machine learning system(s) 420 on computing device CD_SOLO. Then, computing device CD_SOLO can receive inference/prediction request(s) 440 to provide inference(s) and/or prediction(s) 450 and can use trained machine learning model(s) 432 operating on input data 430 to responsively provide inference(s) and/or prediction(s) 450, where inference(s) and/or prediction(s) 450 can be provided using a user interface and/or a display, as one or more electronic communications, as one or more printed documents, etc.

In some examples, two or more computing devices CD_CLI and CD_SRV can be used to provide inference(s) and/or prediction(s) 450. For example, a first computing device CD_CLI can generate and send inference/prediction request(s) 440 to a second computing device CD_SRV. Upon reception of inference/prediction request(s) 440 from CD_CLI, CD_SRV can use trained machine learning model(s) 432, perhaps after performing the training of machine learning system(s) 420, to operate on input data 430 and responsively determine inference(s) and/or prediction(s) 450. After determining inference(s) and/or prediction(s) 450, CD_SRV respond to the requests from CD_CLI by providing inference(s) and/or prediction(s) 450 to CD_CLI.

Notably, in the examples above, CD1, CD2, CD_SOLO, CD_CLI, and CD_SRV could take the form of vehicle 100 or another similar vehicle.

As mentioned above, vehicle 100 may detect objects in its surrounding environment in various ways. In some embodiments, vehicle 100 may use a thermal imaging system to actively transmit an electromagnetic signal (e.g., near-infrared light) that will be reflected by target objects near vehicle 100. The thermal imaging system may capture the reflected electromagnetic signals using a detector element. In other embodiments, the thermal imaging system may passively capture infrared radiation (e.g., mid-infrared light or far-infrared light) that is emitted as heat from target objects near vehicle 100. The captured reflected electromagnetic signals and/or the captured infrared radiation may enable vehicle 100 to classify objects in its surrounding environment using thermography techniques (e.g., classify the objects as living or non-living objects based on the temperature variations between objects).

Yet, the ability for vehicle 100 to accurately classify objects may be limited by daily/seasonal variations in its surrounding environment. Factors such as the amount of sunlight, ambient temperature in the environment, and so on can introduce noise into the captured reflected electromagnetic signals or captured infrared radiation. And because thermography generally uses temperature contrasts between objects and their background environment, variations to the surrounding environment may make it difficult to apply thermography to accurately discern objects. As an example, a living being may have a different thermal contrast from a surrounding environment at night than during the middle of the day.

Some solutions attempt to normalize these variations via radiometrically-calibrated cameras that estimate temperatures in the surrounding environment. That is, these radiometrically-calibrated cameras may be configured to use a standard emissivity value across a surrounding environment. However, using a standard emissivity can reduce the accuracy of thermography techniques. For example, asphalt has a significantly different emissivity than grass, and thus setting a standard emissivity for both of these materials can lead to inaccurate object classifications.

To address these and other issues, the present embodiments provide for a machine learning system that can be trained to generate one or more prior thermal maps based on the environmental attributes surrounding a vehicle. Using these prior thermal maps, the thermal variations in the environment surrounding the vehicle can be normalized. Further, the machine learning system described herein can utilize visible and near-infrared reflectivity, 2-color infrared emissions, and/or LIDAR data to predict intrinsic emissivity of various elements in the environment, thereby improving the classification of objects within such environments. Other benefits are also possible.

Figure 5:
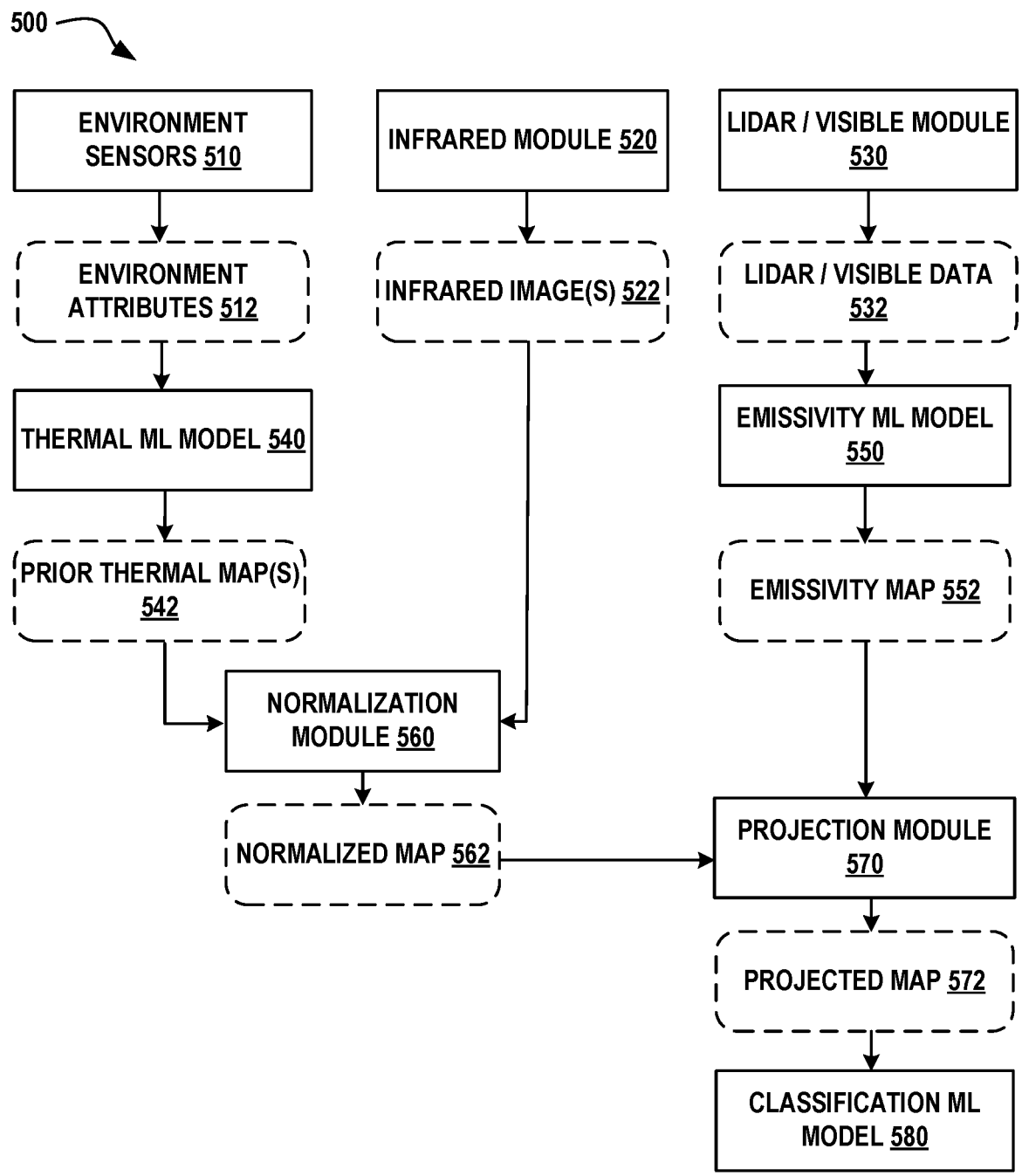
FIG. 5 illustrates a system, in accordance with example embodiments.

FIG. 5 illustrates example system 500, which may be configured to classify objects within an environment through which vehicle 100 is navigating, in accordance with example embodiments. System 500 is shown to include environment sensors 510, infrared module 520, LIDAR/visible module 530, thermal machine learning (ML) model 540, emissivity ML model 550, normalization module 560, projection module 570, and classification machine learning ML model 580.

Environment sensors 510 may be configured to ascertain the physical properties associated with the current environment surrounding vehicle 100. These physical properties may include properties representing ambient/background characteristics of the surrounding environment. Environment sensors 510 may correspondingly generate environment attributes 512, which are signals representative of the current environment surrounding vehicle 100.

Infrared module 520 may be configured to generate infrared image(s) 522 that correspond to the environment through which vehicle 100 is navigating. In some embodiments, infrared module 520 actively emits near-infrared light pulses that get reflected from the respective points in the environment. The intensity of these reflected pulses (i.e., return pulses) may be measured by infrared module 520 and may be captured as infrared image(s) 522. In some embodiments, infrared module 520 could passively measure infrared radiation (e.g., mid-infrared or far-infrared radiation) that is emitted as heat from target objects near vehicle 100. The intensity of the measured infrared radiation may be captured as infrared image(s) 522. In some embodiments, infrared image(s) 522 represent a plurality of different images captured at a plurality of different times from the environment.

LIDAR/visible module 530 may be configured to generate LIDAR data/visible light data from the environment through which vehicle 100 is navigating. In some embodiments, LIDAR/visible module 530 may utilize laser rangefinder/LIDAR unit 128 to transmit electromagnetic signals in the near-infrared spectrum (e.g., 905 nm or 1550 nm) that will be reflected by various objects near vehicle 100. In some embodiments, LIDAR/visible module 530 may utilize camera 130 to transmit electromagnetic signals in the visible light spectrum (e.g., 380 nm-740 nm) that will be reflected by various objects near vehicle 100. LIDAR/visible module 530 may capture reflected electromagnetic signals and may responsively make various determinations about the objects that reflected the electromagnetic signals. For example, LIDAR/visible module 530 may determine the reflectivity of the objects that reflected the electromagnetic signals based on the radiant energy of the reflected electromagnetic signals. Accordingly, LIDAR/visible data 532 may represent the radiant energy of reflected electromagnetic signals captured by LIDAR/visible module 530 from the environment.

Thermal ML model 540 may be implemented as software instructions executable by a processor (e.g., processor 113), as programmable circuitry (e.g., a field-programmable gate array (FPGA)), as purpose-built circuitry (e.g., an application-specific integrated circuit (ASIC)), or a combination thereof. Thermal ML model 540 may be communicatively connected to environment sensors 510. During operations, thermal ML model 540 may receive environment attributes 512 from environment sensors 510 and may process environment attributes 512 to generate prior thermal map(s) 542. Prior thermal map(s) 542 may correspond thermal maps (e.g., 3-D or 2-D) that were captured under similar physical properties as environment attributes 512.

Vehicle 100 may use one or more of prior thermal map(s) 542 to normalize thermal variations in infrared image(s) 522. For example, upon infrared module 520 generating infrared image(s) 522 representative of the environment surrounding vehicle 100, thermal ML model 540 may also correspondingly generate prior thermal map(s) 542 using environment attributes 512 received from environment sensors 510. Then, both infrared image(s) 522 and prior thermal maps(s) 542 may be transmitted to normalization module 560, which may be implemented as software instructions executable by a processor (e.g., processor 113). Normalization module 560 may subtract prior thermal maps(s) 542 from infrared image(s) 522 to create normalized map 562. The idea here is that because normalization module 560 removes the thermal noise/thermal background in infrared image(s) 522, the resulting normalized map 562 enables objects to exhibit higher contrast from their surrounding environment, which improves the ability to classify these objects. In some embodiments, if multiple prior thermal map(s) 542 are used, normalization module 560 may average or otherwise weight the respective values of the multiple thermal maps before performing normalization. In some embodiments, normalization module 560 may also operate to redact or otherwise remove areas within prior thermal map(s) 542 that contain a predefined object type (e.g., a living being).

Emissivity ML model 550 may be implemented as software instructions executable by a processor (e.g., processor 113). Emissivity ML model 550 may be communicatively connected to LIDAR/visible module 530. During operations, emissivity ML model 550 may receive LIDAR/visible data 532 from LIDAR/visible module 530 and may process LIDAR/visible data 532 to generate emissivity map 552. In examples, each point (e.g., pixel) in emissivity map 552 may labeled with an associated emissivity value. Accordingly, emissivity map 552 can be used to predict intrinsic emissivity of various objects in the environment surrounding vehicle 100.

Projection module 570 may be implemented as software instructions executable by a processor (e.g., processor 113). Projection module 570 make take as input both normalized map 562 and emissivity map 552. Then, projection module 570 may match the coordinates of emissivity map 552 and normalized map 562 and may project the emissivity values from emissivity map 552 onto normalized map 562. The resulting projected map 572 would then contain the emissivity values for each point in normalized map 562.

In some embodiments, projection module 570 may combine emissivity map 552 and normalized map 562 to generate a temperature map. In other words, projected map 572 may take the form of a temperature map of the environment surrounding vehicle 100. To do this, projection module 570 may use emissivity map 552 to determine the emissivity values for various objects in the environment. Then, projection module 570 may calculate the contact temperatures for each object by using the object's determined emissivity value and the object's infrared radiation as captured by normalized map 562.

In some embodiments, system 500 may directly determine temperature maps via 2 color-ratio thermometry. For example, infrared module 520 may contain infrared light-emitter devices and/or photodetectors/cameras operating on different spectral wavebands (e.g., mid-wave infrared (3 to 5 µm) and long-wave infrared (7 to 14 µm)). As a result, the temperature map can be computed by calculating ratios between respective spectral intensity information of the different wavebands.

Classification ML model 580 may be implemented as software instructions executable by a processor (e.g., processor 113). Classification ML model 580 may be communicatively connected to projection module 570. During operations, classification ML model 580 may receive projected map 572 from projection module 570 and may process projected map 572 to classify objects within projected map 572. In examples, classification ML model 580 may be configured to identify living objects, traffic signals and signs, roadways, vegetation, and other environmental features such as mailboxes, benches, garbage cans, sidewalks, and/or any other object within the environment that may be of interest to the operation of vehicle 100.

In example embodiments, classification ML model 580 may make spatio-temporal associations of objects to improve the classification accuracy. For example, classification ML model 580 may operate to classify objects at timestamps T-1 and T-2. When performing this classification, classification ML model 580 may be configured to assign identifiers to each of the classified objects in timestamps T-1 and T-2. Then, upon classifying objects at timestamp T, classification ML model 580 may assign a high confidence to an object's classification if the identifier for the object was present in timestamps T-1 and T-2. For example, if at timestamps T-1 and T-2, "Pedestrian A" was present, then classification ML model 580 may assign a higher confidence to a "Pedestrian A" classification at timestamp T. In some embodiments, classification ML model 580 may make spatio-temporal associations of objects using Mahalanobis distances, taking into account the position of the objects between timestamps and uncertainty information from a Kalman filter.

In example embodiments, classification ML model 580 may take the form of a convolutional neural network (CNN). In some cases, this CNN may follow a semantic segmentation architecture, using an encoder network coupled to a decoder network. For example, classification ML model 580 may take the form of a U-Net. Classification ML model 580 may also take the form of trained machine learning model(s) 432.

In example embodiments, classification ML model 580 may be configured to detect objects with a confidence threshold. The confidence threshold may vary depending on the type of object being detected. For example, the confidence threshold may be lower for an object that may require a quick responsive action, such as brake lights on another vehicle. However, in other embodiments, the confidence threshold may be the same for all detected objects.

When the confidence associated with a detected object is greater than the confidence threshold, classification ML model 580 may assume the object was correctly recognized and responsively adjust the control of vehicle 100 based on that assumption.

When the confidence associated with a detected object is less than the confidence threshold, the actions that classification ML model 580 takes may vary. In some embodiments, classification ML model 580 may cause vehicle 100 to react as if the detected object is present despite the low confidence level. In other embodiments, classification ML model 580 may cause vehicle 100 may react as if the detected object is not present. In some embodiments, when the object is detected as having a confidence below the confidence threshold, the object may be given a preliminary identification, and classification ML model 580 may cause vehicle 100 to adjust the operations in response to the preliminary identification. Such an adjustment of operation may take the form of stopping, switching to a human-controlled (e.g., manual) mode of operation, changing a velocity (e.g., a speed and/or direction), among other possible adjustments.

In some embodiments, in response to determining that an object has a detection confidence that is below the threshold, classification ML model 580 may transmit, to a remote computing system, such as remote computing system 302, a request for remote assistance with the identification of the object. Additionally, and/or alternatively, if vehicle 100 has an obstructed view its surrounding environment and/or if environment sensors 510, infrared module 520, or LIDAR/visible module 530 are malfunctioning, vehicle 100 may request remote assistance from the remote computing system.

As discussed above, the remote computing system may take various forms. For example, the remote computing system may be a second computing device within a second vehicle that is separate from vehicle 100. The remote computing system may within a threshold distance (e.g., within 100 m or 1000 m) from vehicle 100 and may be communicated with via wireless communication system 146 or network 304. The remote computing system may be configured to provide vehicle 100 with data such as environment attributes 512, infrared image(s) 522, LIDAR/visible data 532, prior thermal map(s) 542, emissivity map 552, normalized map 562, and/or projection map 572. In some embodiments, the data transmitted by the remote computing system to vehicle 100 may be determined by the remote computing system within a threshold time limit (e.g., 1 ms, 1 s) from when infrared module 520 generates infrared image(s) 522.

In other embodiments, even if the classification ML model 580 detects an object having a confidence that meets or exceeds the threshold, classification ML model 580 may cause vehicle 100 may operate in accordance with the detected object (e.g., come to a stop if the object is identified with high confidence as a stop sign), but may be configured to request remote assistance at the same time as (or at a later time from) when vehicle 100 operates in accordance with the detected object.

Figure 6A:
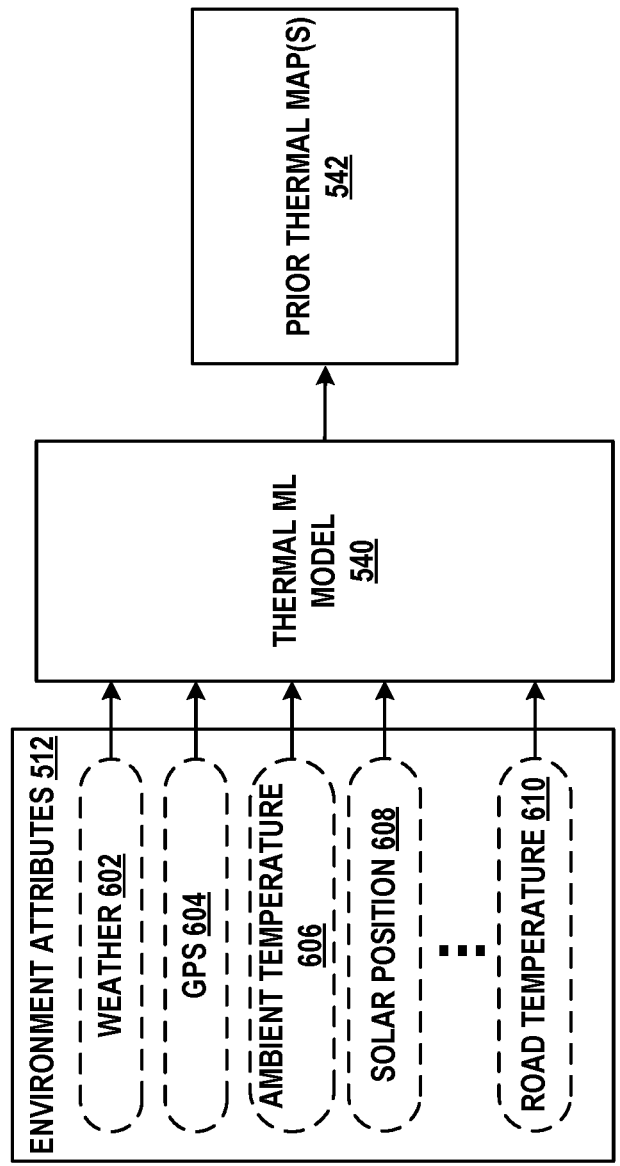
FIG. 6A illustrates aspects of a thermal machine learning model, in accordance with example embodiments.

FIG. 6A illustrates aspects of thermal ML model 540, in accordance with example embodiments. In line with the discussion above, environment attributes 512 may take the form of input data 430, thermal ML model 540 may take the form of trained machine learning model 432, and prior thermal map(s) 542 may take the form of inference(s) and/or prediction(s) 450.

Environment attributes 512 may represent physical properties associated a current environment surrounding vehicle 100. These physical properties may include weather conditions 602 of the current environment, GPS 604 (which may take the form of GPS 122) information regarding the current position of vehicle 100 with respect to the Earth, current ambient temperature 606 of the current environment, a current solar position 608 of the sun with respect to vehicle 100, and current road temperatures 610 of the road beneath vehicle 100. In some embodiments, GPS 604 and the time of day can be used to estimate solar position 608 (e.g., vehicle 100 may be operable to determine the sun's position based on the date and location). Notably, other environment attributes 512 are also possible.

Thermal ML model 540 may be configured to receive environment attributes 512 as an N-dimensional vector. For example, environment attributes 512 may be passed to thermal ML model 540 as a plurality of values X1-XN (i.e., X1, X2, X3, X4, X5, X6, X7, X8, X9, and X10 through XN) an N-dimensional vector space. Thermal ML model 540 may be trained to predict one or more prior thermal maps that were captured under the similar physical properties as environment attributes 512. The prior thermal maps may be captured by vehicle 100 at a prior date or by another vehicle operating in the same environment as vehicle 100 at the prior date. Thermal ML model 540 may be trained with several (e.g., 1000, 10000) pairs of (environment attributes, thermal maps), where the environment attributes represent training features and the thermal maps represent labels. In some cases, thermal machine learning model 514 may only be trained with pairs of (environment attributes, thermal maps) collected at night (e.g., as detailed by solar position 608).

In example embodiments, each prior thermal map in prior thermal map(s) 542 may be associated with (i) a probability value indicting the prior thermal map's correlation to environment attributes 512, and (ii) a timestamp indicating the date in which the prior thermal map was captured. In some examples, vehicle 100 may decide to utilize the highest correlated prior thermal maps from prior thermal map(s) 542 (e.g., any prior thermal map with a correlation above 90% or 80%). In other examples, vehicle 100 may decide to utilize all sufficiently correlated (e.g., correlations above 70%) prior thermal maps that were captured in the last N days (e.g., 7 days, 14 days). Other ways of selecting prior thermal maps are also possible. It will be understood that other correlation values and/or correlation thresholds are possible and contemplated within the scope of the present disclosure.

Figure 6B:
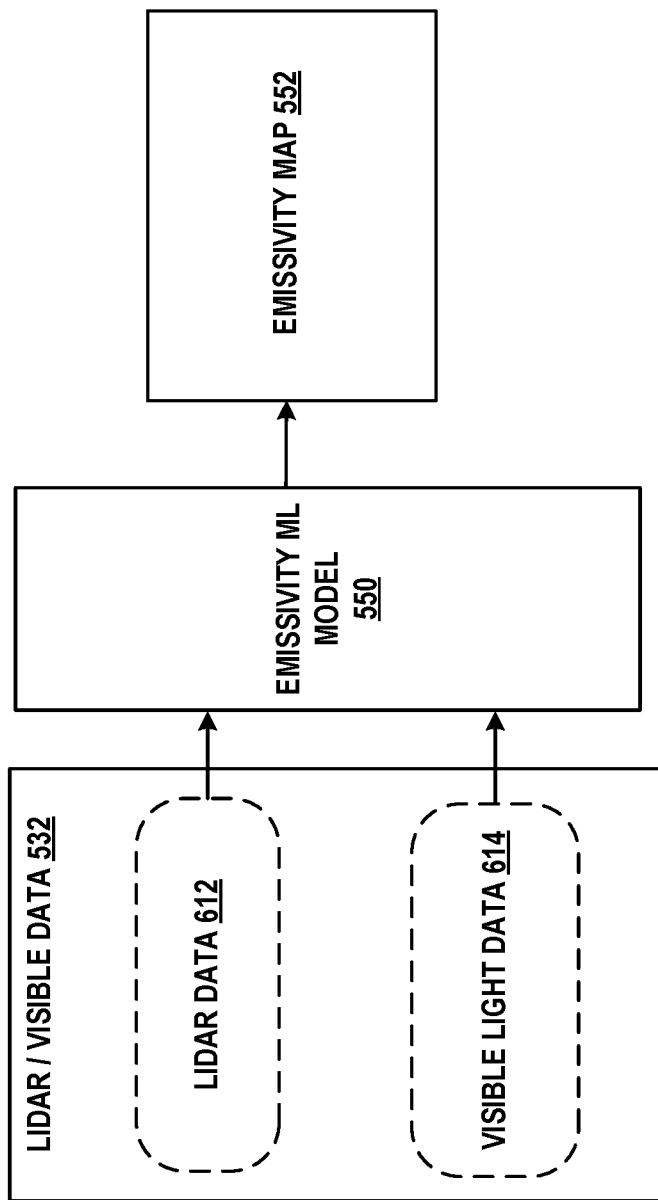
FIG. 6B illustrates aspects of an emissivity machine learning model, in accordance with example embodiments.

FIG. 6B illustrates aspects of emissivity ML model 550, in accordance with example embodiments. In line with the discussion above, LIDAR/visible data 532 may take the form of input data 430, emissivity ML model 550 may take the form of trained machine learning model 432, and emissivity map 552 may take the form of inference(s) and/or prediction(s) 450. As shown in FIG. 6B, LIDAR/visible data 532 may include LIDAR data 612 and visible light data 614.

As described above, LIDAR data 612 may represent the radiant energy of electromagnetic signals captured in the infrared spectrum from the environment surrounding vehicle 100. For example, laser rangefinder/LIDAR unit 128 may be configured to (i) transmit an electromagnetic signal in the near-infrared spectrum that will be reflected by various objects near vehicle 100 and (ii) capture electromagnetic signals that reflect off the objects. Visible light data 614 may represent the radiant energy of electromagnetic signals captured in the visible light spectrum from the environment surrounding vehicle 100. For example, camera 130 may be configured to (i) transmit an electromagnetic signal in the visible light spectrum that will be reflected by various objects near vehicle 100 and (ii) capture electromagnetic signals that reflect off the objects.

In some embodiments, LIDAR data 612/visible light data 614 may additionally include, as a parameter in the data, the pointing direction of the apparatus used to capture LIDAR data 612/visible light data 614. That is, the apparatus (e.g., laser rangefinder/LIDAR unit 128, camera 130, or another apparatus) may be operable to discretize the environment surrounding vehicle 100 into a finite set of pointing directions covering the 360° range of the apparatus. Since an object's emissivity can be angularly dependent, including the pointing direction may improve the predictions made by emissivity ML model 550.

Similar to thermal ML model 540, emissivity ML model 550 may be configured to receive LIDAR/visible data 532 as an N-dimensional vector. For example, LIDAR/visible data 532 may be passed to emissivity ML model 550 as a plurality of values X1-XN (i.e., X1, X2, X3, X4, X5, X6, X7, X8, X9, and X10 through XN) in N-dimensional vector space. After receiving LIDAR/visible data 532, emissivity ML model 550 may predict an emissivity map 552 that corresponds to the scene captured by LIDAR/visible data 532. Emissivity ML model 550 may be trained with several (e.g., 1000, 10000) pairs of (LIDAR/visible data, emissivity maps), with the LIDAR/visible data representing training features and the emissivity maps representing labels.

Emissivity ML model 550 may operate in two phases. In the first phase, emissivity ML model 550 may use the inverse relationship between reflectivity and emissivity to convert the radiant energy values in LIDAR/visible data 532 into a forecasted spectral distribution of emissivity values for each object around vehicle 100. In the second phase, emissivity ML model 550 may predict a true emissivity spectrum for each object that best correlates with the forecasted spectral distribution of emissivity values. Using the true emissivity spectrum, emissivity ML model 550 can infer emissivity values for each object at any wavelength. As a result, emissivity ML model 550 can responsively generate emissivity map 552 with emissivity values for each object that corresponds to the same wavelength that infrared module 520 operates at.

IV. Example Methods

Figure 7:
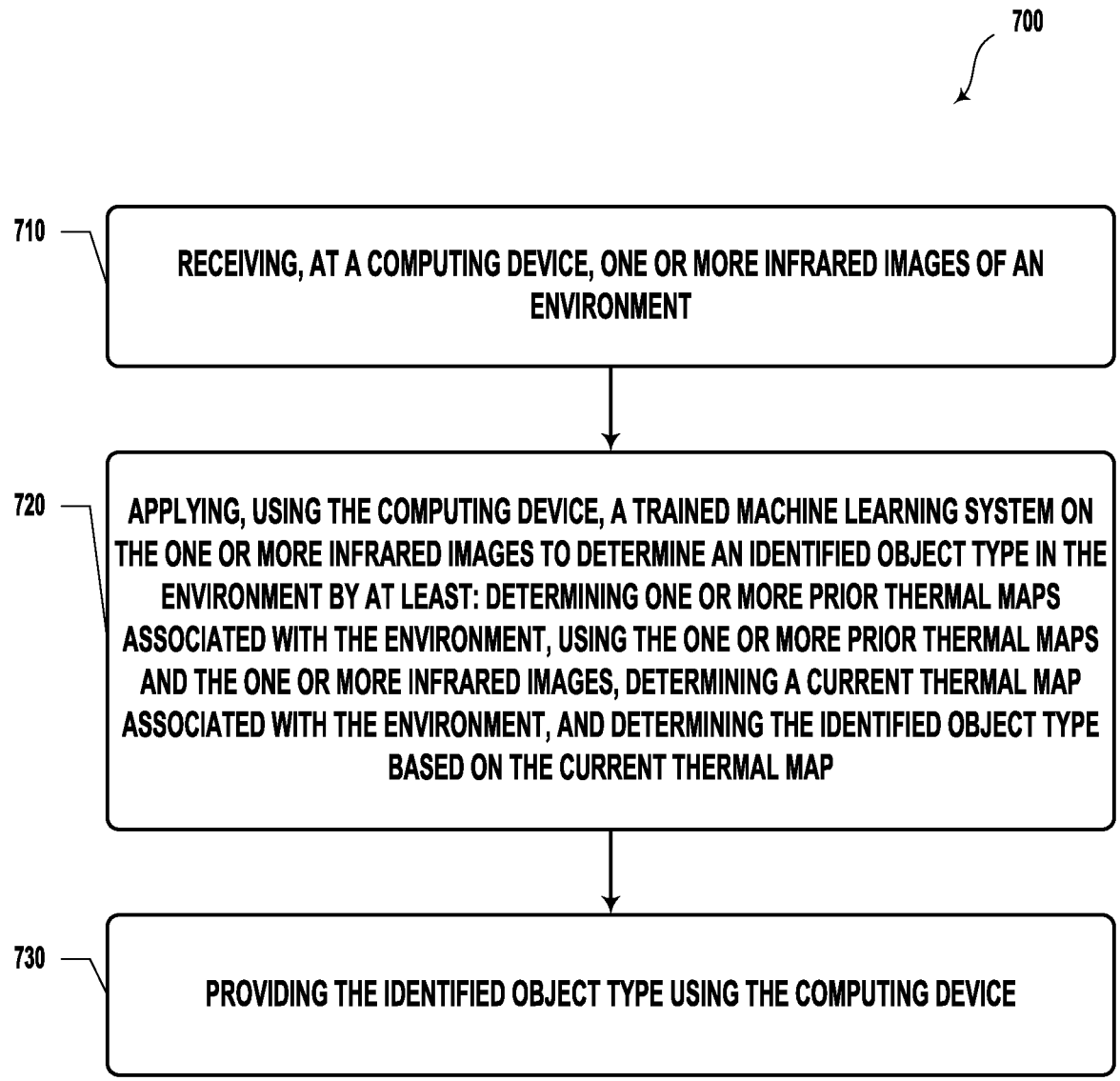
FIG. 7 illustrates a method, in accordance with example embodiments.

FIG. 7 illustrates method 700, in accordance with example embodiments. The operations of method 700 may be used with any of vehicle 100 or 200, server computing system 306, remote computing system 302, or system 500. The operations may be carried out by, for example, control system 106, computer system 112, or circuitry that is configured to perform the operations.

Block 710 includes receiving, at a computing device, one or more infrared images of an environment. In some embodiments, receiving the one or more infrared images of the environment could include receiving a plurality of infrared images from an infrared camera, such as laser rangefinder/LIDAR 128, camera 130, or infrared module 520, via a wired or wireless communication link.

Block 720 includes applying, using the computing device, a trained machine learning system on the one or more infrared images to determine an identified object type in the environment. Applying the trained machine learning system may involve determining one or more prior thermal maps associated with the environment. Applying the trained machine learning system may further involve, using the one or more prior thermal maps and the one or more infrared images, determining a current thermal map associated with the environment. Applying the trained machine learning system may also involve determining the identified object type based on the current thermal map.

Block 730 includes providing the identified object type using the computing device. In some embodiments, providing the identified object type could include transmitting the identified object type to the vehicle 100/200 by way of a wired or wireless communication link. Other ways to provide the identified object type for use are possible and contemplated In some embodiments, the identified object type is a living object. For example, the living object may take the form of a pedestrian, motorcyclist, biker, dog, or horse.

In some embodiments, determining the one or more prior thermal maps involves receiving, from a plurality of sensors communicatively coupled to the computing device, a current thermal state of the environment, and, based on the current thermal state, determining the one or more prior thermal maps from a plurality of prior thermal maps stored on the computing device.

In some embodiments, the plurality of sensors comprises of at least one of: an ambient temperature sensor, a GPS sensor, and a solar sensor operable to determine a current position of the sun.

In some embodiments, the computing device is incorporated into a scanning laser system. In such embodiments, each of the one or more prior thermal maps is associated with an angle of the scanning laser system and determining the one or more prior thermal maps is further based on a current angle of the scanning laser system.

In some embodiments, the one or more prior thermal maps comprise one or more regions that have been altered, redacted, or deleted based on a removed object type.

In some embodiments, determining the current thermal map associated with the environment involves calibrating a thermal contrast of the one or more infrared images based on the one or more prior thermal maps.

Some embodiments further involve determining a current spatial point cloud of the environment based on data received from a LIDAR system; identifying, using the current spatial point cloud, objects in the environment; and calculating emissivity values for the identified objects, where determining the identified object type is further based on the calculated emissivity values.

In some embodiments, the current thermal map comprises the current spatial point cloud projected onto the one or more infrared images.

Some embodiments further involve determining current visible light images based on data from a camera system; identifying, using the current visible light images, objects in the environment; and calculating emissivity values for the identified objects, where determining the identified object type is further based on the calculated emissivity values.

In some embodiments, the one or more infrared images comprises a set of temporally successive infrared images of the environment. In such embodiments, applying the trained machine learning system on the one or more infrared images involves a spatio-temporal association of the identified object type between the one or more infrared images In some embodiments, the spatio-temporal association comprises assigning unique identifiers to each object in the environment that is of the identified object type.

In some embodiments, the trained machine learning system comprises a convolutional neural network. In some embodiments, the convolution neural network is a segmentation network having an encoding path and a decoding path In some embodiments, the one or more prior thermal maps comprise thermal maps determined by a second computing device positioned in a different location in the environment from the computing device.

In some embodiments, the thermal maps determined by the second computing device are determined within a threshold time limit from when the computing device receives the one or more infrared images.

Figure 8:
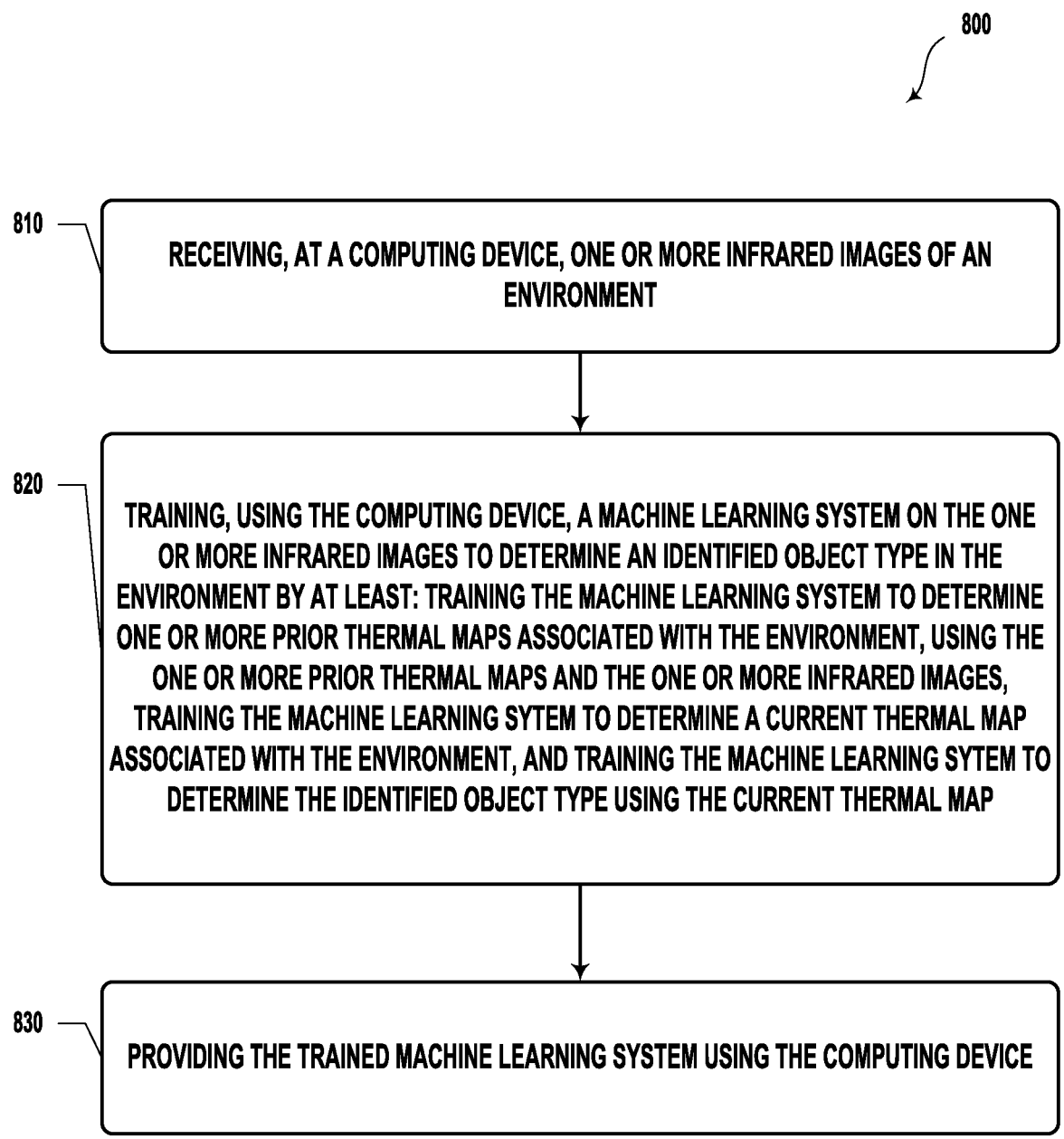
FIG. 8 illustrates a method, in accordance with example embodiments.

FIG. 8 illustrates method 800, in accordance with example embodiments. The operations of method 800 may be used with any of vehicle 100 or 200, server computing system 306, remote computing system 302, or system 500. The operations may be carried out by, for example, control system 106, computer system 112, or circuitry that is configured to perform the operations.

Block 810 involves receiving, at a computing device, one or more infrared images of an environment. In some embodiments, receiving the one or more infrared images of the environment could include receiving a plurality of infrared images from an infrared camera, such as laser rangefinder/LIDAR 128, camera 130, or infrared module 520, via a wired or wireless communication link.

Block 820 involves training, using the computing device, a machine learning system on the one or more infrared images to determine an identified object type in the environment. Training the machine learning system may involve training the machine learning system to determine one or more prior thermal maps associated with the environment. Training the machine learning system may further involve using the one or more prior thermal maps and the one or more infrared images, training the machine learning system to determine a current thermal map associated with the environment. Training the machine learning system may also involve training the machine learning system to determine the identified object type using the current thermal map.

Block 830 involves providing the trained machine learning system using the computing device. In some embodiments, providing the trained machine learning system could include transmitting the trained machine learning system to the vehicle 100/200 by way of a wired or wireless communication link. Other ways to provide the trained machine learning system for use are possible and contemplated In some embodiments, the one or more infrared images include infrared images with spectral intensity information corresponding to a plurality of respective spectral wavebands. In these embodiments, training the machine learning system to determine a current thermal map associated with the environment includes calculating ratios between respective spectral intensity information so as to calculate emissivity of objects in the environment.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A computer-implemented method, comprising:
   receiving, at a computing device, one or more infrared images of an environment;
   applying, using the computing device, a trained machine learning system on the one or more infrared images to determine an identified object type in the environment by at least:
      determining one or more prior thermal maps associated with the environment,
      determining a current spatial point cloud of the environment based on data received from a LIDAR system,
      identifying, using the current spatial point cloud, objects in the environment; and
      calculating emissivity values for the identified objects, using the one or more prior thermal maps and the one or more infrared images,
   determining a current thermal map associated with the environment, and
      determining the identified object type based on the current thermal map and the calculated emissivity values; and
   providing the identified object type using the computing device.

2. The computer-implemented method of claim 1, wherein the identified object type is a living object.

3. The computer-implemented method of claim 1, wherein determining the one or more prior thermal maps comprises:
   receiving, from a plurality of sensors communicatively coupled to the computing device, a current thermal state of the environment; and
   based on the current thermal state, determining the one or more prior thermal maps from a plurality of prior thermal maps stored on the computing device.

4. The computer implemented method of claim 3, wherein the plurality of sensors comprises of at least one of: an ambient temperature sensor, a global positioning system (GPS) sensor, and a solar sensor operable to determine a current position of the sun.

5. The computer-implemented method of claim 3, wherein the computing device is incorporated into a scanning laser system, wherein each of the one or more prior thermal maps is associated with an angle of the scanning laser system, and wherein determining the one or more prior thermal maps is further based on a current angle of the scanning laser system.

6. The computer implemented method of claim 1, wherein the one or more prior thermal maps comprise one or more regions that have been altered, redacted, or deleted based on a removed object type.

7. The computer-implemented method of claim 1, wherein determining the current thermal map associated with the environment comprises calibrating a thermal contrast of the one or more infrared images based on the one or more prior thermal maps.

8. The computer-implemented method of claim 1, wherein current thermal map comprises the current spatial point cloud projected onto the one or more infrared images.

9. The computer-implemented method of claim 1, further comprising:
determining current visible light images based on data from a camera system;
identifying, using the current visible light images, objects in the environment; and
calculating emissivity values for the identified objects, wherein determining the identified object type is further based on the calculated emissivity values.

10. The computer-implemented method of claim 1, wherein the one or more infrared images comprises a set of temporally successive infrared images of the environment, and wherein applying the trained machine learning system on the one or more infrared images comprises a spatio-temporal association of the identified object type between the one or more infrared images.

11. The computer-implemented method of claim 10, wherein the spatio-temporal association comprises assigning unique identifiers to each object in the environment that is of the identified object type.

12. The computer-implemented method of claim 1, wherein the trained machine learning system comprises a convolutional neural network.

13. The computer-implemented method of claim 12, wherein the convolution neural network is a segmentation network having an encoding path and a decoding path.

14. The computer-implemented method of claim 1, wherein the one or more prior thermal maps comprise thermal maps determined by a second computing device positioned in a different location in the environment from the computing device.

15. The computer-implemented method of claim 14, wherein the thermal maps determined by the second computing device are determined within a threshold time limit from when the computing device receives the one or more infrared images.

16. The computer-implemented method of claim 1, wherein the computing device is part of an autonomous vehicle system.

17. A computer-implemented method, comprising:
receiving, at a computing device, one or more infrared images of an environment, wherein the one or more infrared images comprise infrared images with spectral intensity information corresponding to a plurality of respective spectral wavebands;
training, using the computing device, a machine learning system on the one or more infrared images to determine an identified object type in the environment by at least:
training the machine learning system to determine one or more prior thermal maps associated with the environment,
using the one or more prior thermal maps and the one or more infrared images, training the machine learning system to determine a current thermal map associated with the environment, wherein training the machine learning system to determine the current thermal map associated with the environment comprises calculating ratios between respective spectral intensity information so as to calculate emissivity of objects in the environment; and
training the machine learning system to determine the identified object type using the current thermal map; and
providing the trained machine learning system using the computing device.

18. A computing device, comprising:
one or more processors; and
data storage, wherein the data storage has stored thereon computer-executable instructions that, when executed by the one or more processors, cause the computing device to carry out functions comprising:
receiving one or more infrared images taken of an environment;
applying a trained machine learning system to the one or more infrared images to determine an identified object type in the environment by at least:
determining a current spatial point cloud of the environment based on data received from a LIDAR system,
identifying, using the current spatial point cloud, objects in the environment; and
calculating emissivity values for the identified objects, determining one or more prior thermal maps associated with the environment,
using the one or more prior thermal maps and the one or more infrared images,
determining a current thermal map associated with the environment, and
determining the identified object type using the current thermal map and the calculated emissivity values; and
providing the identified object type.

* * * * *